United States Patent

[11] 3,576,067

| [72] | Inventors | Calvin D. Loyd;<br>Ralph W. Yocum, Peoria, Ill. |
|---|---|---|
| [21] | Appl. No. | 709,018 |
| [22] | Filed | Feb. 28, 1968 |
| [45] | Patented | Apr. 27, 1971 |
| [73] | Assignee | Caterpillar Tractor Co.<br>Peoria, Ill. |

[54] FRICTION WELDING IRREGULARLY SHAPED OBJECTS
1 Claim, 4 Drawing Figs.

[52] U.S. Cl. ................................................. 29/470.3,
76/108, 156/73, 173/104, 228/2
[51] Int. Cl. ........................................................ B23k 23/00
[50] Field of Search............................................ 228/2;
29/470.3; 156/73; 76/108

[56] References Cited
UNITED STATES PATENTS

| 3,295,613 | 1/1967 | Anderson..................... | 29/470.3 |
| 3,234,645 | 2/1966 | Hollander et al. ............ | 228/2X |
| 3,444,611 | 5/1969 | Bogart.......................... | 29/470.3 |
| 3,452,421 | 7/1969 | Cheng et al.................. | 29/470.3 |
| 3,465,545 | 9/1969 | Stamm ........................ | 29/470.3X |

OTHER REFERENCES
Friction Welding of Metals by Vill, 1959, pages 58— 61. Copy in Gr. 320

*Primary Examiner*—John F. Campbell
*Assistant Examiner*—Robert J. Craig
*Attorney*—Fryer, Tjvensvold, Feix, Phillips & Lempio

ABSTRACT: Friction welding irregular-shaped workpieces by providing a minimal contact area on one of the workpieces and intentionally applying excess energy and pressure to the weld zone to produce excess flash material.

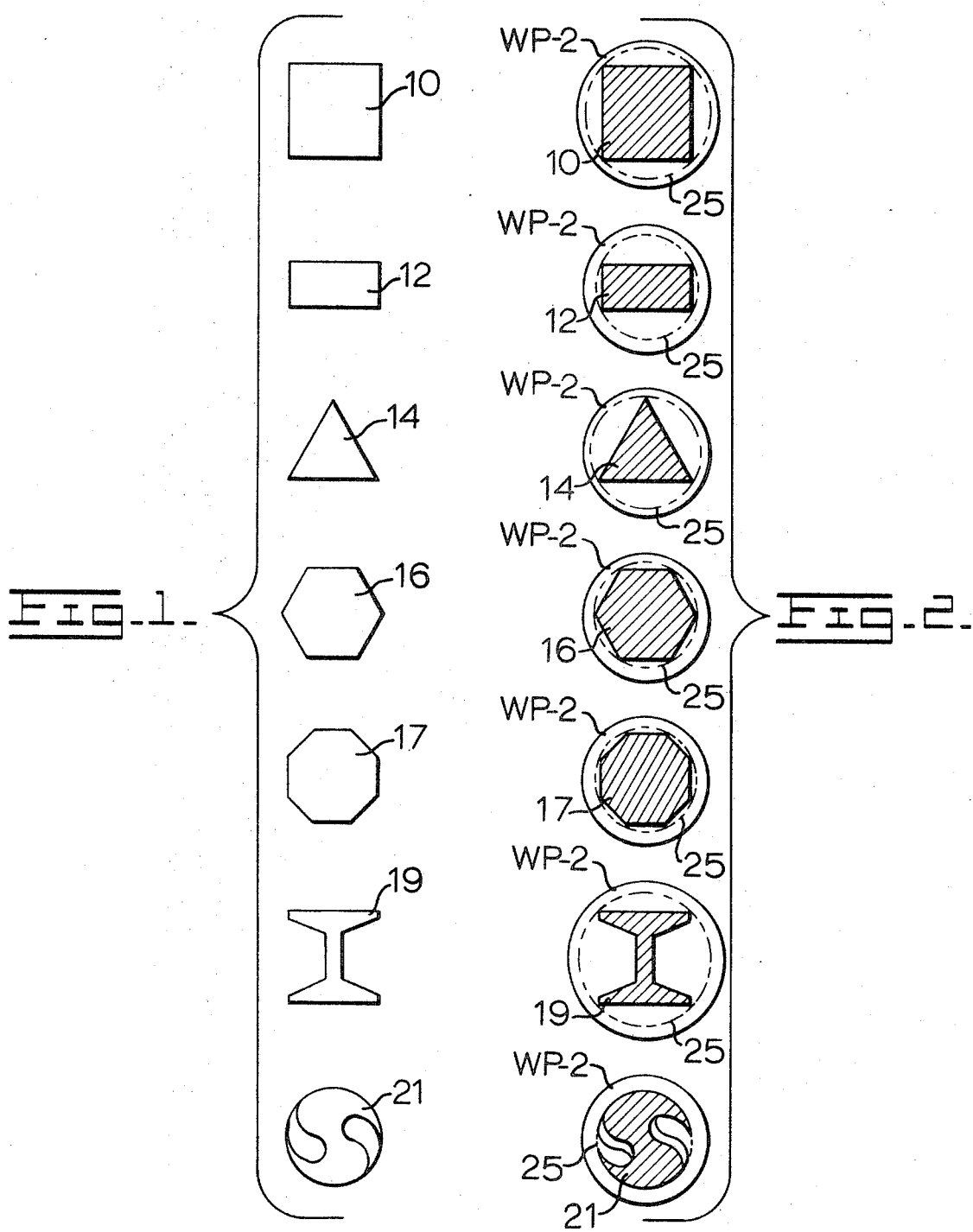

PATENTED APR 27 1971

INVENTORS
CALVIN D. LOYD
RALPH W. YOCUM

BY
ATTORNEYS

FRICTION WELDING IRREGULARLY SHAPED OBJECTS

BACKGROUND OF THE INVENTION

This invention relates to improvements in friction welding of the general type in which two workpieces are subjected to relative rotation while in rubbing contact with each other to generate frictional heat to raise the workpieces to a suitable welding temperature whereupon the relative rotation subsides and the workpieces become bonded to each other.

It is also to be understood that the invention is applicable to the inertia-welding process as described in U.S. Pat. No. 3,273,233 and as set forth below.

In the inertia-welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to engagement of the part at the interface. The stored energy is discharged into the interface through frictional heating and plastic working developed at the interface as the rubbing contact slows the rotating weights and the bonding cycle is concluded.

Since the discovery of the friction-welding process, different opinions have been expressed as to the possibility of welding irregular or noncircular workpieces by this method. Those skilled in the art were of the general opinion that since one piece had to be rotated at least the contact area of this workpiece should be circular in shape. If the contact area was other than circular in shape then all of the area to be welded would not be in rubbing contact with the second workpiece at all times during the rotating cycle. Therefore, part of the weld area would periodically be exposed to atmosphere which would allow oxides to form throughout these portions of the weld area. It was considered that the formation of such oxides would prevent the formation of a commercially satisfactory weld, especially in applications wherein the weld would be subjected to large loads.

It is the principle object of the present invention to provide a method of friction-welding irregular- or noncircular-shaped workpieces wherein the resultant weld will be of the same quality as that which would be obtained by friction welding two circular workpieces of the same materials.

Other objects and advantages of the present invention will be apparent from the following description and claims and are illustrated in the accompanying drawings which, by way of illustration, show preferred embodiments of the present invention and the principles thereof and what is now considered to be the best mode contemplated for applying these principles. It is recognized that other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a plan view of a group of typical exemplary noncircular weld piece configurations which may be friction welded in accordance with the present invention;

FIG. 2 is a plan view illustrating the manner in which noncircular weld pieces as shown in FIG. 1 may be friction welded to a second workpiece;

DESCRIPTION OF THE PREFERRED EMBODIMENT

Figure 3:
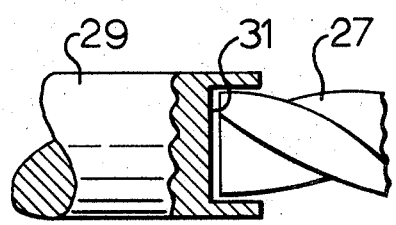
FIG. 3 is a side elevation, partially in section, illustrating one manner in which flash material from the weld interface may be controlled; and, FIG. 4 is a side elevation, partially in section, illustrating a modified means for controlling flash material.

FIG. 1 illustrates the configuration of some of the types of irregular or noncircular weld specimens which have been successfully friction welded by the method of the present invention. Thus, in FIG. 1 there is shown a square-shaped specimen 10, a rectangular specimen 12, a triangular specimen 14, a hexagonal specimen 16, an octagonal specimen 17, an I-beam specimen 19 and a twist drill 21. It should be recognized that many other irregular or noncircular specimens could be welded according to the method of the present invention, and those specimens depicted in FIG. 1 should be considered exemplary and not limiting.

FIG. 2 illustrates each of the specimens depicted in FIG. 1 and the manner of locating and friction welding each such specimen to a second workpiece WP-2. While the workpiece WP-2 has been shown in each instance as circular in shape it should be recognized that this is not an essential of the invention but has been done merely for purposes of illustration. Thus, the workpiece WP-2 could be square, hexagonal or any other shape so long as it presents a continuous area of contact which is greater than the largest transverse dimension of the irregular-shaped workpiece to be welded thereto such as represented by any of the workpieces 10, 12, 14, 16, 17, 19 or 21.

The phantom outline 25 of each workpiece group in FIG. 2 illustrates the largest dimension which the irregular workpiece would trace upon the workpiece WP-2 when the irregular workpiece is rotated about its geometrical center. One of the important aspects of the present invention resides in friction welding an irregular or noncircular workpiece to a second workpiece, such as WP-2, wherein the second workpiece provides a continuous contact surface which is greater in diameter than the largest transverse dimension of the irregular workpiece. The larger diametrical contact area of the workpiece WP-2 prevents the material of both workpiece WP-2 and the material of the noncircular workpiece from flashing away from the outer corners of the noncircular workpiece. This avoids separation and oxidation in this area.

As noted above, one of the conditions for successfully welding irregular-shaped workpieces resides in providing a contact area on the second workpiece which is of greater extent than the largest transverse dimension of the irregular workpiece. Another condition which ought to be imposed when welding an irregular or noncircular-shaped weld piece is the provision of a greater amount of energy and pressure than that which would normally be required to weld two circular members of the same respective diameters. By providing this increased input energy and pressure, a greater amount of material is flashed from the interface of the workpieces than would normally occur. This excess flash material serves two purposes. Firstly it helps prevent the formation of harmful oxides which would tend to weaken the weld area and secondly the excess flash material tends to form a flash ring which gives added strength to the weld zone. In addition, the formation of the flash ring may be further controlled by restraining means as will be more specifically set forth below.

The intentional use of excess weld energy produces an excess amount of flash to form a type of flash ring around the irregular or noncircular weld piece which greatly aids in the formation of a commercially acceptable bond between the two workpieces being joined. In a similar manner the process of the present invention employs the intentional use of excess welding and forging pressure to forge excess material and oxides out away from the weld interface at or near the end of a friction-bonding operation which also aids in the formation of a commercially acceptable bond.

Figure 4:
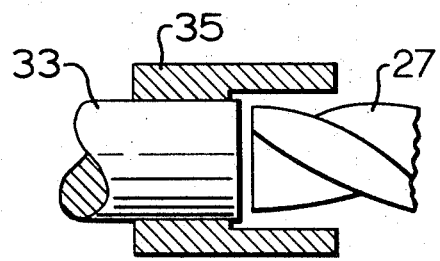

FIGS. 3 and 4 illustrate a further exemplary embodiment of the invention wherein the irregular-shaped workpiece takes the form of a twist drill 27 which is to be joined to a shank member of less costly material than the drill portion per se. In FIG. 3 the shank member 29 is formed with a counterbore 31 which counterbore serves the purpose of helping to form the excess flash material into a round flash ring thus keeping oxidation of the exposed areas of the irregular-shaped twist drill 27 to a minimum. By providing a counterbore on a mating weld piece, as the pieces are welded and the flash is produced, the sidewalls of the counterbore act to constrain the flash material and form it into a circular shape which tends to fill the void areas of the noncircular weld piece.

FIG. 4 illustrates a similar method which aids in the formation of a flash ring formed from the excess amount of flash which is produced by the method of the present invention. In FIG. 4 the twist drill 27 is to be friction welded to a drill shank 33 formed of a less costly material than the twist drill itself. A restraining die 35 is positioned about the weld interface between the two workpieces 27 and 33 to help form the flash material into a flash ring thus keeping oxidation of the exposed area of the irregular-shaped weld piece 27 to a minimum.

As will be recognized by those skilled in the art a material savings, and thereby a cost savings, may be realized in many applications of the method of the subject invention.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of friction welding a twist drill having an irregular cross section to a shank member having a larger diameter than the twist drill comprising:
   forming a counterbore in the shank member for receiving one end of the twist drill;
   rotating the shank member relative to the twist drill;
   engaging the relatively rotating twist drill and the counterbored portion of the shank member in rubbing contact;
   intentionally using excess weld energy and excess welding and forging pressure to forge excess material and oxides out of the weld interface to produce an excess amount of flash material in an amount sufficient to cause the counterbore in the shank member to form the excess flash material in a round ring and to force the flash material inwardly to fill up the exposed areas of the irregular-shaped twist drill and prevent oxidation.